United States Patent [19]
Kodama

[11] Patent Number: 5,671,069
[45] Date of Patent: Sep. 23, 1997

[54] PIXEL CLOCK GENERATOR

[75] Inventor: Kouichi Kodama, Saitama, Japan

[73] Assignee: Fuji Xerox Co., Ltd., Tokyo, Japan

[21] Appl. No.: 417,252

[22] Filed: Apr. 5, 1995

[30] Foreign Application Priority Data

Jul. 4, 1994 [JP] Japan .................................. 6-173161

[51] Int. Cl.$^6$ .............................. H04N 1/40; H04N 1/36; H04N 1/04

[52] U.S. Cl. ........................ 358/474; 358/471; 358/410; 358/494; 358/409; 358/412

[58] Field of Search .................................. 358/474, 481, 358/471, 410, 494, 409, 412

[56] References Cited

U.S. PATENT DOCUMENTS 4,204,233  5/1980  Swager .................................. 358/293

FOREIGN PATENT DOCUMENTS

| | | |
|---|---|---|
| 0 043 720 | 1/1982 | European Pat. Off. . |
| 0 147 835 | 7/1987 | European Pat. Off. . |
| 0 342 936 | 11/1989 | European Pat. Off. . |
| 64-88418 | 4/1989 | Japan . |

OTHER PUBLICATIONS

Douglas N. Curry, "Polygon Laser Scanner Fast Scan Spatial Linearity Correction," The Sixth International Congress on Advances in Non–Impact Printing Technologies, Oct. 21–26, 1990, pp. 980–985.

"Scan Correction for High–Speed Laser Printers," IBM Technical Disclosure Bulletin, vol. 32, No. 9A, Feb. 28, 1990, pp. 343–344.

Primary Examiner—Kim Vu
Assistant Examiner—Tia M. Harris
Attorney, Agent, or Firm—Finnegan, Henderson, Farabow, Garrett & Dunner, L.L.P.

[57] ABSTRACT

A pixel clock generator in which the frequency of a pixel clock signal is changed over for every scanning face prior to start of image record scanning, comprises a first scanning time detection circuit for detecting scanning period of time from the start of image scanning to the end of the image scanning; a reference clock signal generation circuit for generating a reference clock signal to make the frequency of the reference clock signal variable; a number-of-pixel-clocks setting circuit for setting the number of pixel clocks corresponding to forecast scanning time; a second scanning time detection circuit for counting the pixel clocks generated based the reference clock signal by the number set by the number-of-pixel-clocks setting circuit to detect the scanning time corresponding to the forecast scanning time; a comparison circuit for comparing the time detected by the first scanning time detection circuit with the time detected by the second scanning time detection circuit to obtain a comparison result; a correction data storage circuit for storing data for correcting the second scanning time for every scanning face; a renewal circuit for renewing the correction data of the correction data storage circuit according to the result of the comparison result; and a correction circuit to perform variable control by correcting the frequency of the reference clock signal outputted from the reference clock signal generator according to the data renewed by the renewal circuit.

4 Claims, 4 Drawing Sheets

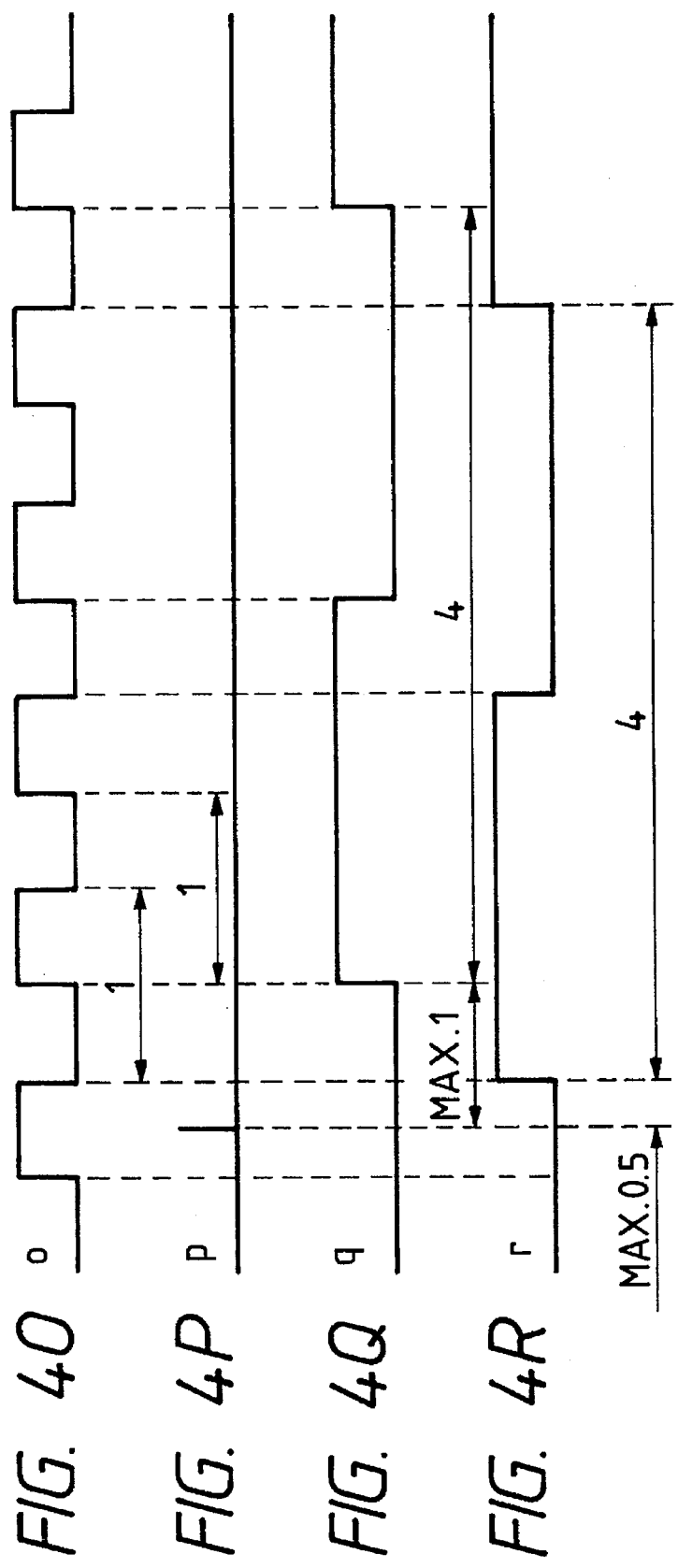

PIXEL CLOCK GENERATOR

BACKGROUND OF THE INVENTION

1. Field of the Invention

The present invention relates to a pixel clock generator for a copying machine, a laser printer, or the like, and particularly to a pixel clock generator in which it is possible to correct the displacement of pixels in the scanning direction caused by variations in the scanning period, in the work accuracy and in the rotational speed of an optical deflector for a copying machine, a laser printer, or the like.

2. Description of the Related Art

Conventionally, an optical deflector is widely used for a copying machine, a laser printer, or the like. For example, in a laser printer, a laser beam generated by a laser driving circuit when driven is modulated in accordance with an image signal, and scanned by a rotary polyhedron mirror so that latent image is formed on a recording medium such as a photosensitive body, and visualized to thereby obtain a visual image by an electrophotographic method.

In such a laser printer, there arise a problem that errors in work accuracy for the respective reflection faces of a rotary polyhedron mirror, deviations of the rotational speed of the rotary polyhedron mirror from the designed value, variations in the rotational speed of the same, etc. cannot be suppressed to certain levels or less, and another problem that recording pixel displacements in the scanning direction and image scale factor errors are caused so that a distorted visual image is formed in the case of high density image processing and in the case where the scanning width is set wide.

As a prior art proposed in order to solve the above problems, there is "a laser recording apparatus" disclosed in Japanese Patent Unexamined Publication Sho 64-88418.

The above prior art discloses a laser recording apparatus in which the scanning period of a laser beam is stored for every reflection face of a scanning means, and the period of a clock pulse for synchronizing an image signal in accordance with the deviation of the detection value of the scanning period from the reference value of the reference scanning period is variably controlled for every reflection face, so that the jitter due to the work accuracy of the reflection faces of the rotary polyhedron mirror, the calculation deviation of the rotational speed of the rotary polyhedron mirror from its designed value, the variation in the rotational speed of the rotary polyhedron mirror, etc, are corrected for every reflection face of the same rotary polyhedron mirror.

In the above prior art apparatus, there arise problems as follows.

That is, in the above laser recording apparatus, there occur a problem that the configuration of a jitter correction circuit becomes larger as the scanning width becomes wider while it is effective in the case where the scanning width is narrow, because operation processing is carried out after the reference value of the reference scanning period and the detection value of the period for every reflection face are stored in a memory, and another problem that there is a limit in the operation speed of the above-mentioned jitter correction circuit so that sufficient counter-measure cannot be taken.

SUMMARY OF THE INVENTION

It is therefore an object of the present invention to provide a pixel clock generator in which the problems in the prior art are eliminated and in which the pixel displacement in the scanning direction due to the variations in the scanning period and in the rotational speed of the optical deflector in a copying machine, a laser printer, or the like is corrected rapidly, and such pixel displacement in the recording image scanning direction is prevented from occurring.

In order to achieve the above object, according to an aspect of the present invention, a pixel clock generator in which the frequency of a pixel clock signal is changed over for every scanning face prior to start of image record scanning, comprises: a first scanning time detection means for detecting scanning time from the start of image scanning to the end of the image scanning; a reference clock signal generator for generating a reference clock signal so as to make the frequency of the reference clock signal variable; a number-of-pixel-clocks setting means for setting the number of pixel clocks corresponding to forecast scanning time; a second scanning time detection means for count the pixel clocks generated on the basis of the reference clock signal by the number set by the number-of-pixel-clocks setting means to thereby detect the scanning time corresponding to the forecast scanning time; a comparison means for comparing the time detected by the first scanning time detection means with the time detected by the second scanning time detection means to thereby obtain a comparison result; a correction data storage means for storing data for correcting the second scanning time for every scanning face; a renewal means for renewing the correction data of the correction data storage means in accordance with the result of the comparison result; and a correction circuit to perform variable control by correcting the frequency of the reference clock signal outputted from the reference clock signal generator in accordance with the data renewed by the renewal means.

According to a preferable mode of the present invention, the pixel clock generator further comprises means for inhibiting the renewal operation of the renewal means prior to the start of image visualization.

According to another preferable mode of the present invention, the pixel clock generator further comprises means for changing the set point of the number-of-pixel-clocks setting means.

According to a further preferable mode of the present invention, in the pixel clock generator, a set point tolerance in the set point of the number of pixel clocks.

According to a still further preferable mode of the present invention, in the pixel clock generator, the pixel clock signal generated on the basis of the reference clock signal is generated by dividing the frequency of the reference clock signal.

According to the present invention, a difference between the time required for counting the pixel clock signal by the number of pixel clocks corresponding to the scanning time for one scanning of the optical deflector and the time required for counting the pixel clock signal by the number of pixel clocks corresponding to the forecast scanning time is obtained so that the oscillation frequency of the reference clock signal is variably controlled for every scanning face in accordance with the thus obtained difference. Accordingly, it becomes possible to correct the pixel displacement in the scanning direction due to the variations in the scanning period of the optical deflector and in the rotational speed of the same.

According to the preferred mode of the present invention, the renewal operation of the renewal means, such as for example, an up/down counter, is inhibited in order to prevent such a disadvantage of irregular variations which sometimes occur in the apparatus in the process where a latent image formed by the record scanning of an image is visualized by an electrophotographic method. Accordingly, no error is generated in the above-mentioned renewal means, such as an up/down counter to thereby make it possible to prevent irregular displacement from occurring in the pixel position in the scanning direction.

BRIEF DESCRIPTION OF THE DRAWINGS

The accompanying drawings, which are incorporated in and constitute a part of this specification, illustrate (an) embodiment(s) of the invention and, together with the description, serve to explain the objects, advantages and principles of the invention. In the drawings.

FIGS. 4O to 4R are time charts showing phase deviation in the case where the nominal frequency is 4 times as high as the pixel clock signal.

DETAILED DESCRIPTION OF THE PREFERRED EMBODIMENTS

Figure 1:
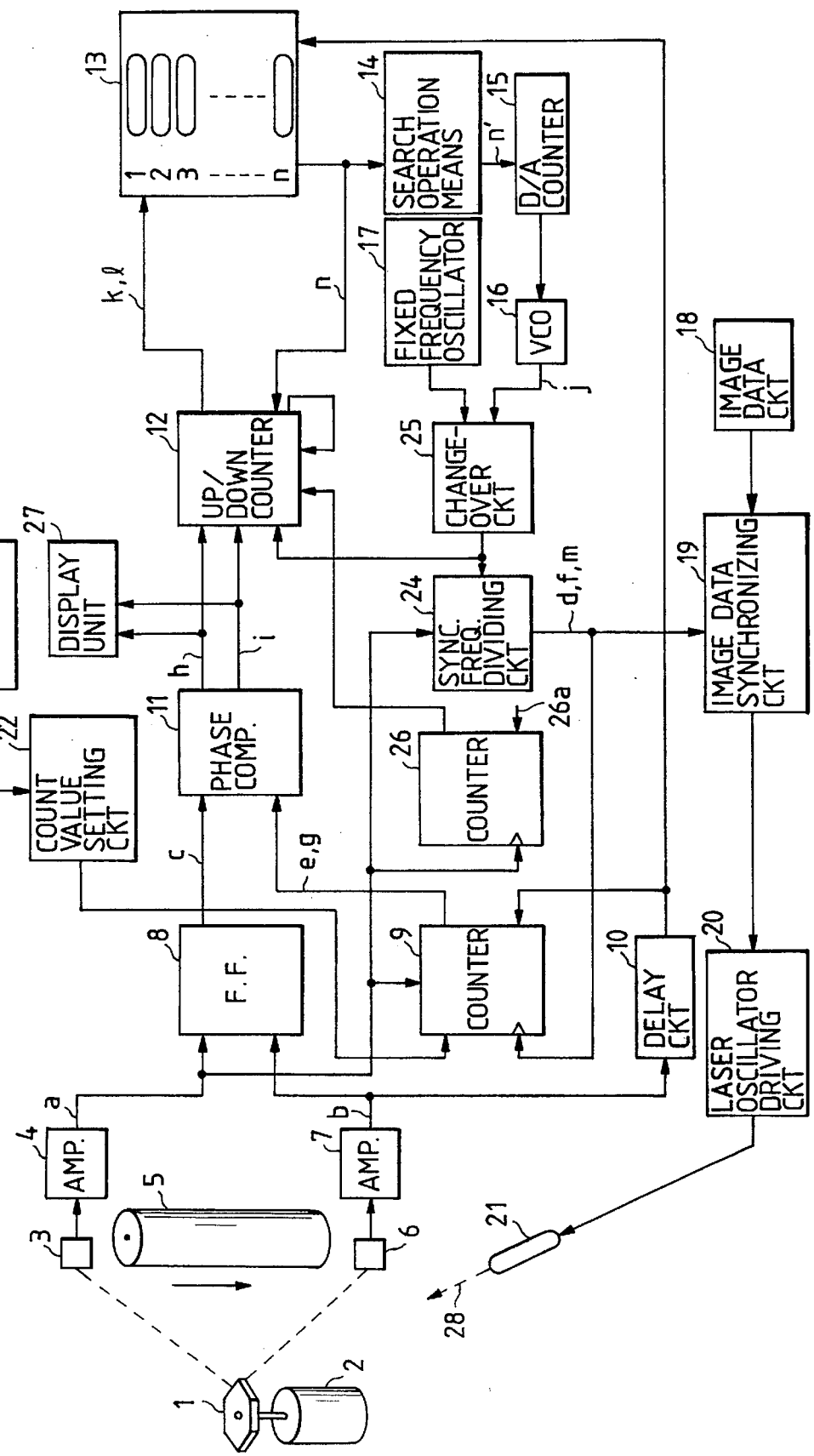
FIG. 1 is a block diagram showing the schematic configuration of a pixel clock generator according to an embodiment of the present invention.

Referring to the drawings, an embodiment of the present invention will be described below in detail.

FIG. 1 is a block diagram showing the schematic configuration of an embodiment of the pixel clock generator according to the present invention, and FIGS. 2A to 2M are time charts showing the circuit operation of the pixel clock generator.

In FIG. 1, a rotary polyhedron mirror 1 is rotated by an electric motor 2 to scan a laser beam 28 emitted from a laser oscillator 21. Detecting the laser beam, an optical sensor 3 supplies the laser beam detection signal to an amplifier 4 which amplifies this detection signal to output a rectangular scanning start detection signal (hereinafter referred to as "SOS signal") (a). When an optical sensor 6 detects the laser beam, the detection output of the optical sensor 6 is amplified by an amplifier 7 so as to provide scanning end detection signal (hereinafter referred to as "EOS signal") (b).

Supplied with the above SOS signal (a) and EOS signal (b), a flip-flop (hereinafter abbreviated to "FF") 8 outputs a scanning width time signal (c) showing the time from the start to end of the scanning, that is, the time for one scanning. A counter 9 counts a pixel clock signal (d) or (f) by the number of pixel clocks set by a count value setting circuit 22 which will be described later. The counter 9 starts counting in response to input of the SOS signal (a) and outputs a pixel clock width signal (e) or (g) by one scanning when it counts over. A delay circuit 10 delays the EOS signal (b) and outputs a reset signal for the counter 9 and a shift operation signal for a shift register 13.

A phase comparator 11 compares the length of the scanning width time signal (c) with the length of the pixel clock width signal (e) or (g). If the length of the scanning width time signal (c) is longer than the length of the pixel clock width signal (e) or (g), the phase comparator 11 generates a down signal (i) of the time width corresponding to the time difference, while in the case when the length of the scanning width time signal (c) is shorter than the length of the pixel clock width signal (e) or (g), the phase comparator 11 generates an up signal (h) of the time width corresponding to the time difference. While being supplied with the down signal (i) or up signal (h), an up/down counter 12 renews the data (n) loaded from a shift register 13 by adding/subtracting the number of reference clock signals (j) outputted from a voltage-controlled oscillator (hereinafter abbreviated to "VCO") 16 to/from the data (n). This renewal operation by the addition/subtraction is inhibited when a carry out signal of the up/down counter 12 is outputted. The data of the counter is fixed to the upper limit of the count value in the up operation while fixed to the lower limit of the count value in the down operation.

A counter 26 outputs a renewal inhibit signal when it has counted a predetermined number of the SOS signals (a) and it is reset by a print start signal 26a. In the case where the renewal inhibit signal is being outputted, the renewal operation of the up/down counter 12 is inhibited. The reason why the renewal operation of the up/down counter 12 is inhibited is as follows.

In the process where a latent image formed by image record scanning is visualized by an electrophotographic method, there is a case where irregular variations occur in the apparatus. Accordingly, the variations are transmitted to the rotary polyhedron mirror 1, optical sensor 3, optical sensor 6, etc. so that irregular errors are generated when the time from the start to end of the scanning is detected. As a result, an error is included in the count value of the up/down counter 12 so that irregular displacement occurs in the pixel position in the direction of scanning. In order to prevent this disadvantage from occurring, the renewal operation of the up/down counter 12 is inhibited.

The shift register 13 is provided with registers corresponding in number to the scanning faces of the rotary polyhedron mirror 1 so that the data stored in the registers are shifted sequentially in response to the shift operation signal outputted from the delay circuit 10. By this operation, up data (k) or down data (l) from the up/down counter 12 are stored in the shift register 13 for every scanning face. A search operation means 14 is supplied with the data (n) from the shift register 13 as an address of a look up table (hereinafter abbreviated to "LUT") and supplied data (n') corresponding to the address to a D/A converter 15. The D/A converter 15 converts the supplied data into an analog voltage signal for controlling the reference clock signal of the VCO 16 and supplied the analog voltage signal to the VCO 16. In response to the input analog voltage signal, the VCO 16 changes the frequency of the reference clock signal (j) and supplied this reference clock signal (j) to a synchronous frequency dividing circuit 24. The relation between the address of the LUT and the data may be written desiredly. Further, since decision is made not through software but through hardware, the operation can be made rapidly. Further, if necessary, the output of the shift register 13 may be supplied as it is directly to the D/A converter 15 while omitting the search operation means 14.

The synchronous frequency dividing circuit 24 is supplied with either one of the reference clock signal (j) from the VCO 16 through an oscillator change-over circuit 25 and the fixed clock signal generated from a fixed frequency oscillator 17. The synchronous frequency dividing circuit 24 synchronously divides the reference clock signal (j) or the fixed clock signal and supplies the resulting signal, as a pixel clock signal to the counter 9 and an image data synchronizing circuit 19. Preferably, the nominal frequency of the reference clock signal (j) or the fixed clock signal is selected to be about 1–8 times as high as the pixel clock signal in order to minimize the phase deviation of the pixel clock signal from the SOS signal (a). The reason why the phase deviation of the pixel clock signal from the SOS signal (a) is minimized by the above manner will be described later in detail with reference to FIGS. 4O to 4R.

The image data synchronizing circuit 19 supplies the image data signal from an image data circuit 18 to a laser oscillator driving circuit 20 while synchronizing the image data signal with the pixel clock signal. The laser oscillator driving circuit 20 drives the laser oscillator 21 on the basis of the image data signal so as to make the laser oscillator 21 emit the laser beam 28 to the rotary polyhedron mirror 1. The oscillator change-over circuit 25 connects the fixed frequency oscillator 17 to the synchronous frequency dividing circuit 24 when the assembly is completed or when the sensor 3, 6, light scanning means 1, 2, or the like, is replaced by another one, while the oscillator change-over circuit 25 connects the VCO 16 to the synchronous frequency dividing circuit 24 in normal use by an user.

A set-point changing means 23 operates to change the set point of the count value setting circuit 22. A rotary switch, a ten-key, an operation means having set buttons for determining the set point, or the like, may be used as the set-point changing means 23. The set point of the count value setting circuit 22 is changed in accordance with the set point change instruction from the set-point changing means 23, and the count value setting circuit 22 supplies this set point to the counter 9 as its preset value. Next, a display unit 27 is constituted by a display means such as lamps, LEDs, LCDs or the like, and displays the down signal (i) or up signal (h) when the down signal (i) or up signal (h) is outputted from the phase comparator 11.

Figure 3:
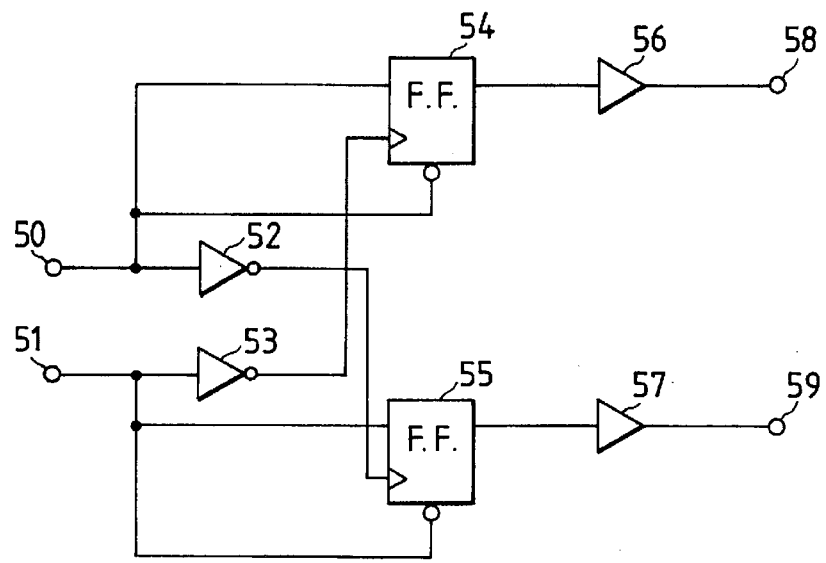
FIG. 3 is a circuit diagram showing an example of the phase comparator.

FIG. 3 shows a specific example of the phase comparator 11. The phase comparator 11 is constituted by inverters 52 and 53; flip-flops 54 and 55; and buffers 56 and 57. The phase comparator 11 is supplied at its input terminal 50 with the scanning width time signal (c) and at its input terminal 51 with the pixel clock width signal (e) or (g), and outputs the down signal (i) from its output terminal 58 and the up signal (h) from its output terminal 59.

Next, a sequence of operation of the present embodiment will be described with reference to FIGS. 1 and 2A to 2M. In FIGS. 2A to 2M, the symbols of the respective signals correspond to those in FIG. 1. The adjustment operation at the above-mentioned time of completion of assembly, parts replacement, etc., will be described.

In adjustment operation, first, the set-point changing means 23 is operated so that a temporary count set point corresponding to a desired forecast scanning time is set in the count value setting circuit 22. This temporary count set point is supplied to the counter 9 from the count value setting circuit 22, and the oscillator change-over circuit 25 is switched so as to connect the fixed frequency oscillator 17 to the synchronous frequency dividing circuit 24.

When the apparatus is actuated, a fixed clock signal is outputted from the fixed frequency oscillator 17, synchronously divided by the synchronous frequency dividing circuit 24 and then supplied as a pixel clock signal to the counter 9 and the image data synchronizing circuit 19. An image data signal from the image data circuit 18 is synchronized with the pixel clock signal by the image data synchronizing circuit 19 and supplied to the laser oscillator driving circuit 20. The laser oscillator 21 is driven by the laser oscillator driving circuit 20 on the basis of the image data signal so that the laser beam 28 is emitted to the rotary polyhedron mirror 1. The laser beam 28 is scanned by the rotary polyhedron mirror 1 from the position of the optical sensor 3 to the position of the optical sensor 6 so that the laser beam 28 is detected by the optical sensor 3 and then by the optical sensor 6, so that the SOS signal (a) and the EOS signal (b) are supplied to the FF 8 and the scanning width time signal (c) indicating the time for one scanning is supplied from the FF 8 to the phase comparator 11.

Subsequently, the pixel clock signal is counted by the counter 9 by the number equal to the above-mentioned temporary set point, and the pixel clock width signal (e) or (g) corresponding to the time required for the counting is supplied to the phase comparator 11.

Next, the length of the scanning width time signal (c) and the length of the pixel clock width signal (e) or (g) are compared with each other in the phase comparator 11, and the up or down signal is displayed in the display unit 27 in accordance with the result of the comparison. When the up or down signal is displayed in the display unit 27, the set-point changing means 23 is operated to change the above-mentioned temporary count set point so that the display is disappeared or the time is shortened. Although design is made such that the set-point changing means 23 is operated by an user or operator in the above example, the design may be made such that the up or down signal is detected electrically and automatically and the temporary count set point is changed so that the up or down signal is not outputted or is below a predetermined quantity. By the operation mentioned above, the setting of the number of pixel clocks is carried out.

Subsequently, the operation in normal use by a user will be described.

In use by a user, the oscillator change-over circuit 25 is switched so that the VCO 16 is connected to the synchronous frequency dividing circuit 24. Upon actuation of the apparatus, the reference clock signal (j) is outputted from the VCO 16, divided by the synchronous frequency dividing circuit 24 and then supplied as the pixel clock signal (d) or (f) to the counter 9 and the image data synchronizing circuit 19. In the following, similarly to the case of the above-mentioned adjustment operation, the laser beam 28 is scanned by the rotary polyhedron mirror 1. At the point of time $t_1$, the start of scanning is detected so that the SOS signal (a) is outputted, and at the point of time $t_3$, the end of scanning is detected so that the EOS signal (b) is outputted. The scanning width time signal (c) which indicates the time width $t_{1-t3}$ is supplied from the FF 8 to the phase comparator 11.

On the other hand, the pixel clock signal (d) or (f) supplied to the counter 9 is counted by the counter 9, and the pixel clock width signal (e) or (g) corresponding to the time ($t_{1-t4}$ or $t_{1-t2}$) required for the counting is supplied to the phase comparator 11 so as to be compared with the scanning width time signal (c) indicating the time $t_{1-t3}$.

Figure 2:
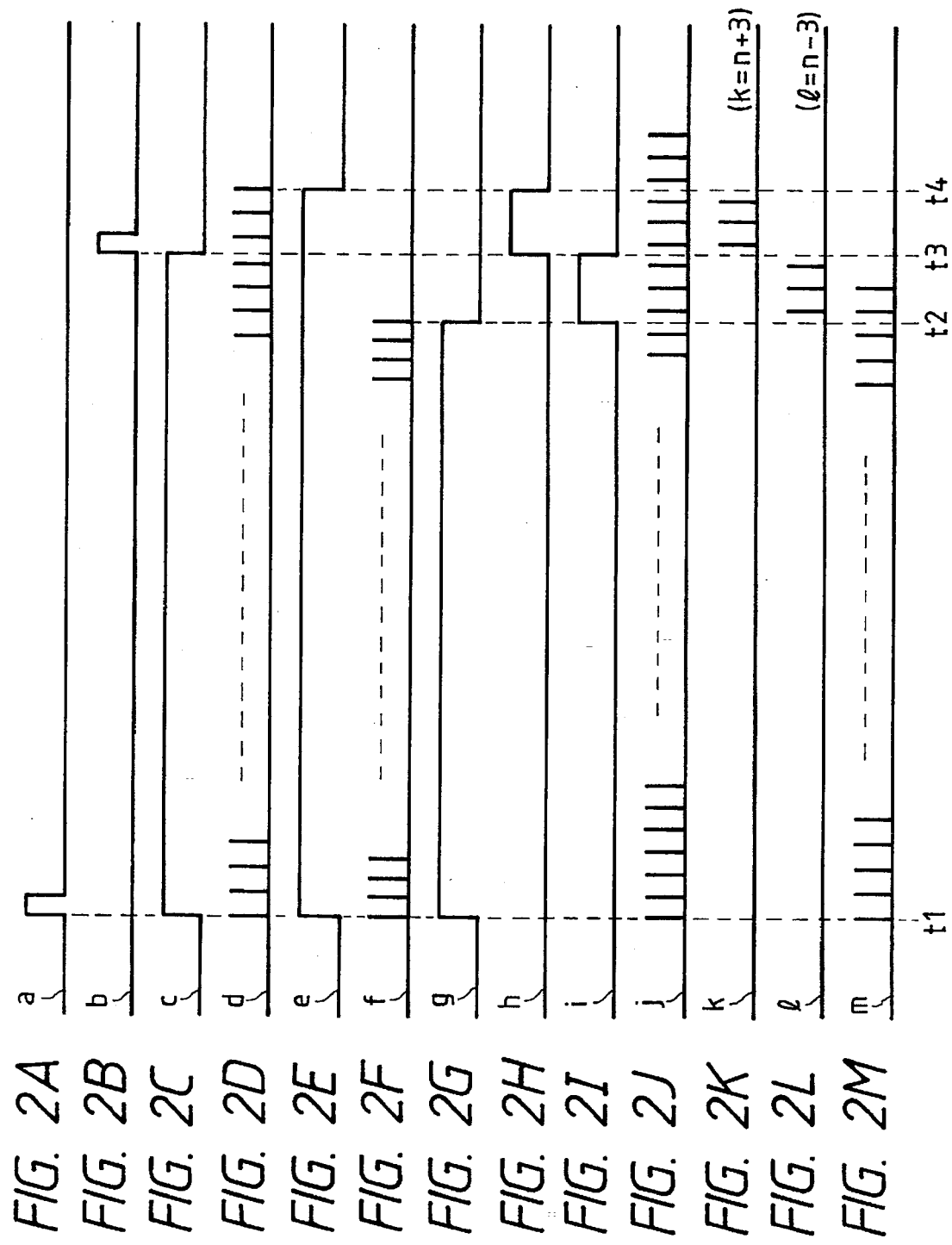
FIGS. 2A to 2M are time charts showing the operation of the pixel clock generator of FIG. 1.

In the case where the signal width of the pixel clock width signal is longer than the scanning width time signal (c) as the pixel clock width signal (e) shown in FIG. 2E, the up signal (h) is outputted from the phase comparator 11. On the other hand, when the signal width of the pixel clock width signal is shorter than the scanning width time signal (c) as the pixel clock width signal (g) shown in FIG. 2G, the down signal (i) is outputted from the phase comparator 11.

While being supplied with the up signal (h), the up/down counter 12 adds the number of the reference clock signals (j) to the data (n) loaded to the up/down counter 12. On the other hand, while being supplied with the down signal (i), the up/down counter 12 subtracts the number of the reference clock signals (j) from the data (n) loaded to the up/down counter 12. As a result, up data l(=n+3) is supplied to the shift resister 13 from the up/down counter 12 in the former case, while down data k(=n−3) is supplied to the shift resister 13 from the up/down counter 12 in the latter case. The shift register 13 holds this k or l as new data in place of the data (n). Data the number of which corresponds to the number of faces of the rotary polyhedron mirror 1 are registered and shifted repeatedly so that the data are renewed by plural times to thereby minimize the up signal (h) or down signal (i) at every data. Although there occurs an error not larger than one clock of the reference clock signal (j) at maximum in the minimization, this error may be reduced by increasing the frequency of the reference clock signal (j).

Figure 5A:
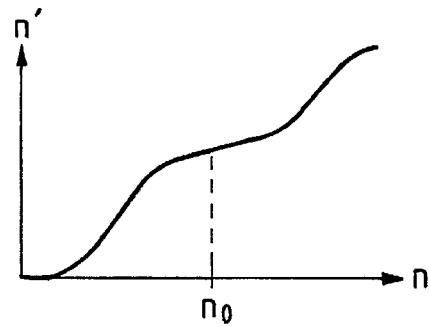
FIGS. 5A and 5B are explanatory diagrams showing the relation between the data stored in the shift register and the reference clock signal outputted from the VCO.
Figure 5B:
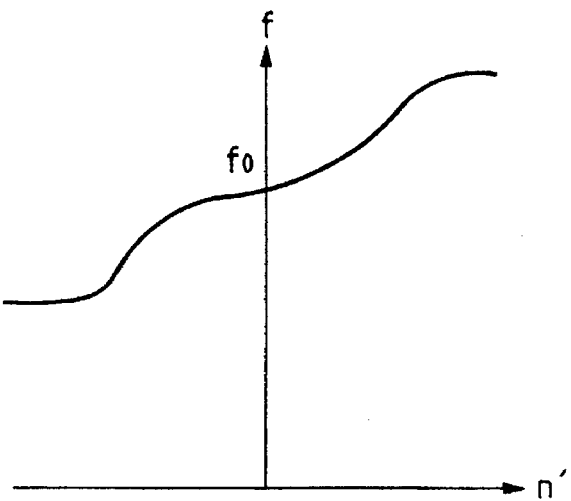

Next, the data (n) outputted from the shift register 13 is supplied to the search operation means 14. An LUT between the address n and the data (n') having such a relation as shown, for example, in FIG. 5A is stored in the search operation means 14, so that if the output data (n) from the shift register 13 is supplied to the search operation means 14, the data (n') corresponding to the address n are outputted from the search operation means 14. The data (n') are converted by the D/A converter into an analog voltage signal which is supplied to the VCO 16. In the VCO 16, the frequency of the reference clock signal (j) is changed in accordance with this analog voltage signal. As a result, as shown in FIG. 5B, the frequency f of the reference clock signal (j) is made high or low when the output signal from the phase comparator 11 is the up signal (h) or the down signal (i), respectively. The thus adjusted frequency f of the reference clock signal (j) is divided by the synchronous frequency dividing circuit 24 which outputs a pixel clock signal (m). When the counter 9 has counted this pixel clock signal (m), the pixel clock signal (e) or (g) outputted from the counter 9 becomes substantially equal to the signal width time signal (c) and the displacement of the pixels in the scanning direction due to fluctuations in scanning period and in rotation of the optical deflector can be corrected accurately.

By repeating the above-mentioned sequence of operations, it is possible to prevent pixel displacement in the record image scanning direction with respect of every scanning face of the optical deflector.

Referring to FIGS. 4O to 4R, explanation will be given of the reason why the phase deviation of the pixel clock signal relative to the SOS signal (a) can be made to be 1⅛ or ½–¹⁄₁₆ of one pixel at the largest if the nominal frequency of the VCO 16 and fixed frequency oscillator 17 is made to be about 1–8 times as high as the pixel clock signal. Here, explanation will be made about the case where the nominal frequency is selected to be 4 times as high as the pixel clock signal.

FIGS. 4O to 4R are time charts showing the phase deviation when the nominal frequency is 4 times as high as the pixel clock signal.

As seen from the drawing, in the case where the frequency in phase with the nominal frequency (o) of the VCO 16 or fixed frequency oscillator 17 is selected, the time from the reception of the input pulse (p) of the SOS signal to the rising of the pixel clock signal (q) having a period which is four times as large as the period of the nominal frequency (o) is one period, at largest, of the nominal frequency (o), and since the period of the pixel clock signal (q) is 4 times as large as the period of the nominal frequency (o), the phase deviation can be suppressed to ¼ phase of one pixel clock at largest. Further, in the case where phase selection is made while including the frequency in reverse phase of the nominal frequency (o), the time required for the rising of the pixel clock signal (r) having a period which is 4 times as large as the period of the nominal frequency (o) is ½ period of the nominal frequency at largest, and since the period in which the pixel clock signal (r) is in H level is two times as large as the period of the nominal frequency (o), the phase deviation can be suppressed to ⅛ phase of one pixel clock at largest. Further, if the nominal frequency is 1~8 times as high as the frequency of the pixel clock signal, the phase deviation can be suppressed within a range of 1~⅛ phase of one pixel clock in the former case, while within a range of ½~¹⁄₁₆ phase of one pixel clock in the latter case. For this, in the above-mentioned range, it is not necessary to carry out phase selection by delay control with large variations. Further, although the nominal frequency is selected to be 1–8 times as high as the frequency of the pixel clock signal in this embodiment, the multiplication may be made larger than 8 times.

As is clearly understood from the above description, according to the main aspect of the present inventions, the frequency of the reference clock signal can be variably controlled for every scanning face in accordance with difference between the scanning time from the detection of scanning start to the detection of scanning end and the time required for counting the pixel clock signal of the number of pixel clocks corresponding to the forecast scanning time so as to make this difference smaller than the period of the reference clock signal. Accordingly, the displacement of pixels in the scanning direction due to fluctuations in scanning period and in rotations of the optical deflector can be corrected accurately. Since the quantity of correction can be determined not though software means but through a hardware configuration, correction can be made rapidly.

According to preferable mode of the present invention, in the process where a latent image formed by record scanning of an image is visualized by an electrophotographic method, it is possible to prevent such a disadvantage that an irregular fluctuation is generated in the apparatus and transmitted to the optical deflector, optical sensors, etc. so that an irregular error is generated when the up/down counter detects the scanning time. And, therefore, it is possible to prevent irregular displacement from occurring in the pixel position in the scanning direction.

According to another preferable mode of the present invention, a set point change means for changing the set point of a count value setting circuit is provided. Accordingly, the number of pixel clocks which will become a reference value in use by an user can be adjusted and set easily so that the user can use the apparatus immediately after completion of assembling, after completion of parts replacement, etc.

According to a further preferable mode of the present invention, a set-point tolerance is provide in setting the number of pixel clocks. Accordingly, it is possible to prevent the setting of the number of pixel clocks at a frequency which cannot be allowed in the range of variable frequency of the reference clock signal, so that the correction operation from the setting of the number of pixel clocks to the determination of the frequency of the reference clock signal can be carried out rapidly.

Further, according to a still further preferable mode of the present invention, the pixel clock signal formed in accordance with the reference clock signal is generated by dividing the frequency of the reference clock signal. Accordingly, the phase deviation of the pixel clock signal relative to a signal indicating the start of scanning can be minimized and the displacement of pixels in the record-image scanning direction can be prevented.

The foregoing description of preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A pixel clock generator in which the frequency of a pixel clock signal is changed over for every scanning face prior to start of image record scanning, said generator comprising:

first scanning time detection means for detecting scanning period of time from the start of image scanning to the end of the image scanning;

reference clock signal generation means for generating a reference clock signal to make the frequency of said reference clock signal variable;

number-of-pixel-clocks setting means for setting the number of pixel clocks corresponding to forecast scanning time;

second scanning time detection means for counting the pixel clocks generated on the basis of said reference clock signal by the number set by said number-of-pixels-clocks setting means to thereby detect the scanning time corresponding to said forecast scanning time;

comparison means for comparing the time detected by said first scanning time detection means with the time detected by said second scanning time detection means to obtain a comparison result;

correction data storage means for storing data for correcting the second scanning time for every scanning face;

renewal means for renewing said correction data of said correction data storage means in accordance with the result of said comparison result;

a correction circuit to perform variable control by correcting the frequency of the reference clock signal outputted from said reference clock signal generator in accordance with the data renewed by said renewal means; and means for inhibiting the renewal operation of said renewal means prior to the start of image visualization.

2. A pixel clock generator according to claim 1, further comprising means for changing the set point of said number-of-pixel-clocks setting means.

3. A pixel clock generator according to claim 1, wherein a set point tolerance is provided in the set point of said number-of-pixel-clocks.

4. A pixel clock generator according to claim 1, wherein the pixel clock signal generated on the basis of said reference clock signal is generated by dividing the frequency of said reference clock signal.

* * * * *